United States Patent
Raza et al.

[11] Patent Number: 5,946,980
[45] Date of Patent: *Sep. 7, 1999

[54] VEHICULAR WHEEL SUSPENSION LINK

[75] Inventors: Irfan F. Raza, Shelby Twp., Mich.;
Ronald D. Walther, Jacobson, Minn.

[73] Assignee: U.S. Farathane Corporation, Utica, Mich.

[*] Notice: Under 35 U.S.C. 154(b), the term of this patent shall be extended for 188 days.

[21] Appl. No.: 08/530,006

[22] Filed: Sep. 19, 1995

[51] Int. Cl.⁶ .................................................. F16C 7/02
[52] U.S. Cl. ........................................ 74/579 R; 74/594
[58] Field of Search ........................... 74/579 R, 579 E, 74/594; 384/300

[56] References Cited

U.S. PATENT DOCUMENTS

| | | | |
|---|---|---|---|
| 1,988,830 | 1/1935 | Buckwalter | 74/579 R |
| 3,266,339 | 8/1966 | Schlechtendahl | 74/579 R |
| 5,064,216 | 11/1991 | Hynds | 74/579 R X |
| 5,282,396 | 2/1994 | Crandall | 74/579 R X |
| 5,417,499 | 5/1995 | Jacques et al. | 384/300 X |

FOREIGN PATENT DOCUMENTS 86 04 122  7/1986  WIPO .................................. 74/579 E

*Primary Examiner*—John A. Jeffery
*Assistant Examiner*—Mary Ann Battista
*Attorney, Agent, or Firm*—Lalos & Keegan

[57] ABSTRACT

A link construction suitable for use in carrying high dynamic loads between a pair of members generally consisting of an elongated member having a pair of spaced openings for receiving the pair of members, formed of a thermoplastic material, the member having an intermediate section between the openings therein provided with an I-shaped cross-sectional configuration, and a bushing disposed in each of the openings, formed of a polyurethane material.

15 Claims, 1 Drawing Sheet

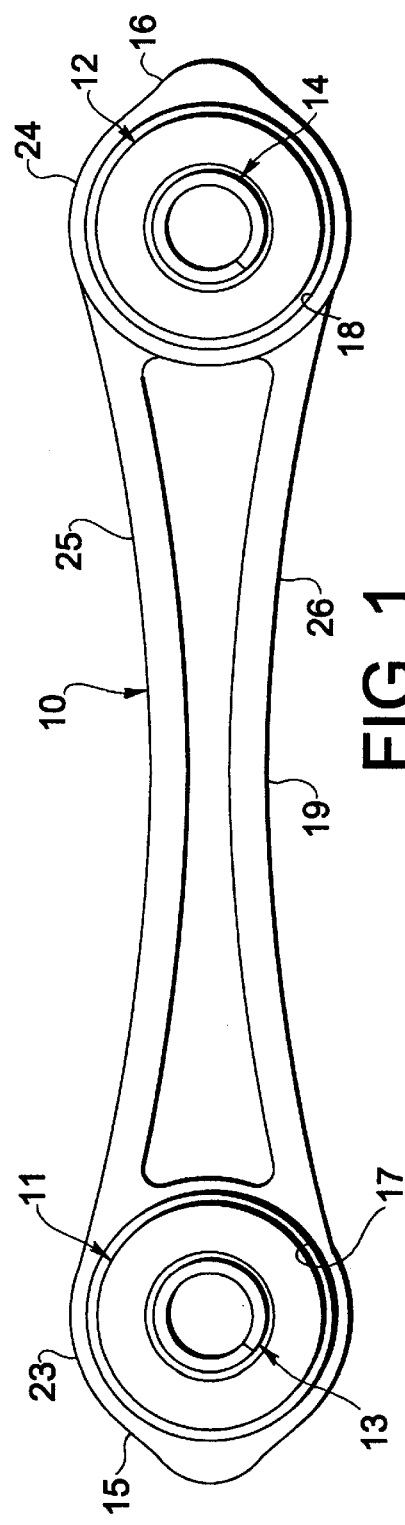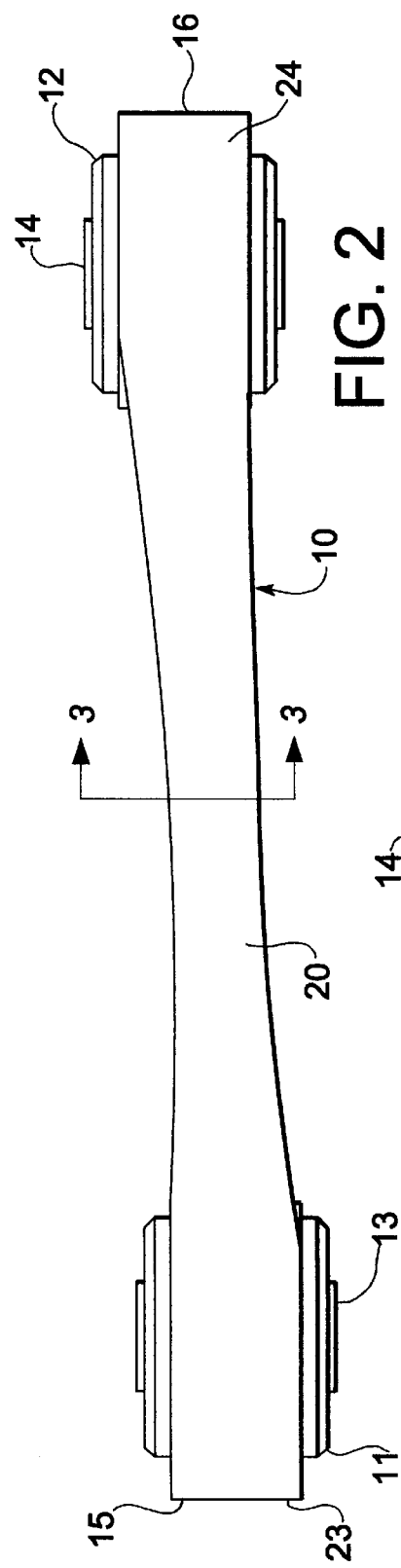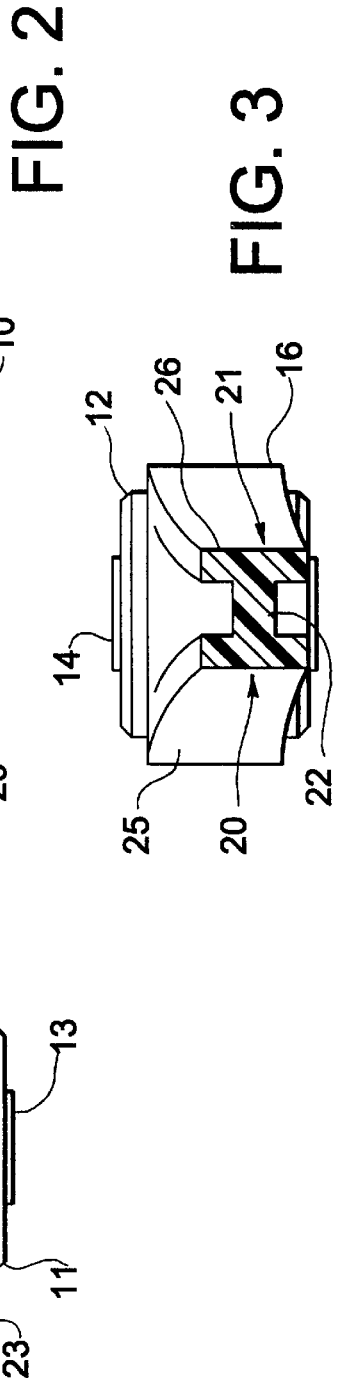

VEHICULAR WHEEL SUSPENSION LINK

This invention relates to a link construction and more particularly to a link construction suitable for use in a wheel suspension system of a vehicle. This invention further contemplates such a link construction which is capable of carrying high dynamic loads imposed during normal operating conditions and which is both lightweight and durable.

BACKGROUND OF THE INVENTION

Link constructions such as stabilizer links typically used in wheel suspension systems of vehicles generally consist of an elongated steel member having a pair of spaced openings for receiving a pair of shafts, studs or pins, and a pair of rubber bushings with steel sleeves inserted in such openings. Because of their low abrasion resistance, rubber bushings used in such applications are required to be bonded to the metallic member. Such bonding, however, creates internal stresses in the rubber material during dynamic loading of the link which eventually results in a failure of the bushings. Rubber bushings further have the disadvantage of being subjected to dry rotting over a period of time, providing a further cause of failure. In addition, the weight of the steel material contributing to the overall weight of the vehicle has been disadvantageous with respect to achieving optimum fuel economies. It thus has been found to be desirable to provide an improved link construction of the type described which not only is capable of carrying dynamic loads in the order of 20,000 p.s.i. but which is lightweight and durable in service.

Accordingly, it is the principal object of the present invention to provide an improved link construction.

Another object of the present invention is to provide an improved link construction suitable for use as a component in a wheel suspension system of a vehicle.

A further object of the present invention is to provide an improved link construction suitable for use in transmitting dynamic loads in the order of 5,000 lbs.

A still further object of the present invention is to provide an improved link construction adapted to interconnect a pair of components in a manner whereby the link is capable of rotary and conical displacement relative to each of the connected components.

Another object of the present invention is to provide an improved link construction adapted to interconnect a pair of components to permit both rotary and conical displacement of the link relative to either of the connected components in which bushings interposed between the link and the connected components will not be subjected to internal stress or deterioration over a period of usage resulting in failure.

A further object of the present invention is to provide an improved link construction which is both lightweight and durable in service.

A still further object of the present invention is to provide a link construction formed of thermoplastic materials with urethane bushings having load/deflection properties comparable to a conventional link construction formed of a steel member with rubber bushings.

Another object of the present invention is to provide a link construction suitable for use in a wheel suspension system of a vehicle which is simple in design, effective in performance and economical to manufacture.

SUMMARY OF THE INVENTION

The present invention provides for a link construction generally consisting of an elongated member having a pair of spaced openings for receiving a pair of shafts, studs or pins such as in a wheel suspension system of a vehicle, formed of a reinforced thermoplastic material, such as nylon. The section of the member intermediate the spaced openings is provided with an I-shaped cross-sectional configuration. Inserted in each of the openings is a bushing formed of a polyurethane material. Glass fibers preferably are provided in the thermoplastic material to enhance the tensile strength of the member, and polytetrafluoroethylene (PTFE), such as Teflon™, preferably is provided in the bushing material to enhance the lubricity of the bushings.

BRIEF DESCRIPTION OF THE DRAWING

FIG. 1 is a side elevational view of an embodiment of the present invention.

FIG. 2 is a top plan view of the embodiment shown in FIG. 1.

FIG. 3 is a cross-sectional view taken along line 3—3 in FIG. 2.

DESCRIPTION OF THE PREFERRED EMBODIMENTS

Referring to the drawings, there is illustrated an embodiment of the invention generally consisting of an elongated member 10, a pair of bushings 11 and 12 and a pair sleeves 13 and 14. Elongated member 10 consists of a pair of enlarged end sections 15 and 16 having openings 17 and 18, and an intermediate section 19. The enlarged end sections may be disposed in longitudinal alignment or may be offset laterally relative to a longitudinal center line as shown in FIG. 2. Openings 17 and 18 have cyndrical walls and parallel axes. Although the axes of openings of 17 and 18 are parallel in the embodiment shown in the drawing, such axes may be angularly displaced relative to each other about a common line depending upon the application of the link. One of such axes may be angularly displaced relative to the other axis at an angle up to 90 degrees.

Intermediate section 11 has an essentially I-shaped cross-sectional configuration as best shown in FIG. 3 and includes a first flange portion 20, a second flange 21 spaced from and disposed substantially parallel to flange portion 20 and an integral, connecting web portion 22. Preferably, each of the flange portions of section 19 are thicker than web portion 22.

As best shown in FIGS. 1 and 2, the enlarged end sections of member 10 are provided with rounded outer surfaces 23 and 24, and outer surfaces 25 and 26 of flange portions 20 and 21 are substantially parallel along an intermediate span thereof and gradually diverge at the ends thereof to merge with rounded portions 23 and 24 of the enlarged sections of the member. Such configuration not only eliminates potential internal stress areas but further facilitates the fabrication of the member.

Member 10 consists of a thermoplastic material and preferably is formed by injection molding. The combination of the thermoplastic material and the beam configuration of the intermediate section of the member provides a high tensile strength to the member. To further increase the tensile strength and rigidity of the member, glass fiber filler may be added to the thermoplastic material in an amount in the range to 30% to 45% by weight and preferably 43% by weight. In addition, a lubricant may be added to the thermoplastic material.

The combination of the thermoplastic material, glass fiber filler and the beam configuration of the intermediate section of the member provides a member having a tensile strength in the order of 20,000 p.s.i. The gradually emerging surfaces of the different portions of the member further provides for the avoidance of stress concentrations upon the application of high loads as would occur in the use of the member in a wheel suspension system of a vehicle.

Any suitable thermoplastic material, such as nylon, may be used for member 10 having suitable properties for the particular application. In the manufacture of the invention for use as stabilizer links in wheel suspension systems of vehicles, a thermoplastic material manufactured by the DuPont Company and sold under the product designation ZYTEL™ 70G43L has been found to be suitable.

Bushings 11 and 12 are identical in shape and function to transmit load between a connecting shaft, stud or pin and member 10, provide a limited amount of rotary and conical displacement between the connecting member and member 10 and to dampen vibrations transmitted between the connecting member and member 10. Each of the bushings has a substantially cylindrical configuration, is formed of a polyurethane material and is press-fit into an opening 17 or 18 in the enlarged end sections of member 10. Preferably, the bushings are formed of a polyether based thermoplastic polyurethane having a durometer hardness in the range of 46 Shore D±5. To provide lubricity to the bushings, an amount of PTFE in the range of 10 to 12% by weight is added to the polyurethane material. It is contemplated that such bushings be formed by injection molding in the conventional manner. Sleeve members 13 and 14 are also identical in configuration and material.

Each consists of a cylindrical steel component preferably plated with nickel which is press-fit into one of the polyurethane bushings for receiving a connecting shaft, stud or pin there through. The sleeves preferably have a hardness in the range of 32 to 40 Rockwell C.

The manufacture of the embodiment as described merely consists of forming member 10 by injection molding, separately formulating the polyurethane material and injection molding the polyurethane bushings, forming the sleeve members by any suitable means, press-fitting the polyurethane bushings into the thermoplastic member and then press-fitting the metallic sleeves into the inserted bushings. Because of the high abrasion resistance of the polyurethane bushings, no bonding of the bushings to the thermoplastic member is required as in the manufacture of links with rubber bushings inserted with link members, thus facilitating the manufacture of the devices.

The link construction as described provides a component that not only is capable of transmitting high dynamic loads over an extended period of time but one that will resist deterioration, allow some displacement between the connected components and will be lubricated to eliminate any objectional squeaking noise.

From the foregoing detailed description, it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

We claim:

1. A vehicular wheel suspension link for use in carrying high dynamic loads between a pair of members comprising:
    an elongated member having a pair of spaced openings for receiving said pair of members, said elongated member being formed of a thermoplastic material, said elongated member having an intermediate section between said openings provided with an I-shaped cross-sectional configuration; and
    a bushing disposed in each of said openings, each said bushing being formed of a polyurethane material.

2. A link according to claim 1 including a sleeve disposed in each of said bushings, each said sleeve being formed of a metal.

3. A link according to claim 1 wherein each of said openings includes an axis and wherein said axes are substantially parallel.

4. A link according to claim 1 wherein said I-shaped intermediate section includes flange portions and a web portion and wherein said flange portions have greater thicknesses than said web portion.

5. A link according to claim 1 wherein said thermoplastic member includes a glass fiber filler.

6. A link according to claim 5 wherein said glass fiber filler content consists of an amount in the range of 30% to 45% by weight.

7. A link according to claim 1 wherein said bushings are formed of a polyether based thermoplastic polyurethane.

8. A link according to claim 1 wherein said bushings are press-fit into said openings.

9. A link according to claim 1 wherein said bushings are formed of a material having a durometer hardness in the range of 46 Shore D ±5.

10. A link according to claim 1 wherein said bushings include a lubricant.

11. A link construction according to claim 10 wherein said lubricant is polytetrafluoroethylene (PTFE).

12. A link according to claim 11 wherein said PTFE content consists of an amount in the range of 10% to 12% by weight.

13. A link according to claim 2 wherein each of said sleeves is formed of a nickel-plated steel.

14. A link according to claim 2 wherein each of said sleeves is press-fit into a corresponding one of said bushings.

15. A link according to claim 2 wherein each of said sleeves is formed of a material having a hardness in the range of 32 to 40 Rockwell C.

* * * * *